Nov. 26, 1935.　　　P. P. SOSINSKI　　　2,022,092

TRACK SHUNTING APPARATUS

Filed March 30, 1933

INVENTOR
Paul P. Sosinski
BY
HIS ATTORNEY

Patented Nov. 26, 1935

2,022,092

UNITED STATES PATENT OFFICE 2,022,092

TRACK SHUNTING APPARATUS

Paul P. Sosinski, Edgewood, Pa., assignor to The Union Switch & Signal Company, Swissvale, Pa., a corporation of Pennsylvania Application March 30, 1933, Serial No. 663,443

9 Claims. (Cl. 246—34)

My invention relates to track shunting apparatus and more particularly to apparatus for providing track circuit shunting by light weight rail vehicles.

I will describe several forms of apparatus embodying my invention, and will then point out the novel features thereof in claims.

Figures 1, 2:
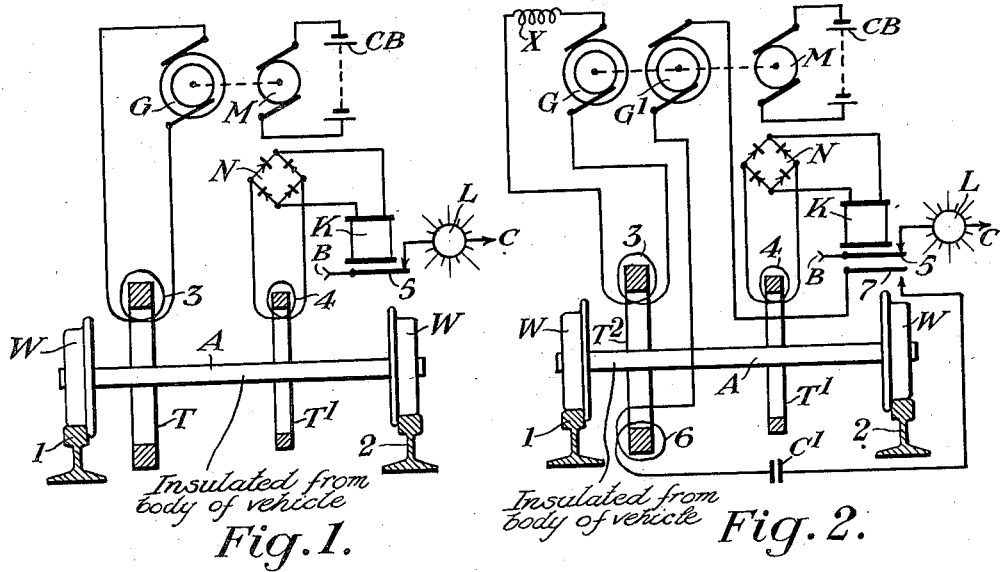
Figures 3, 4:
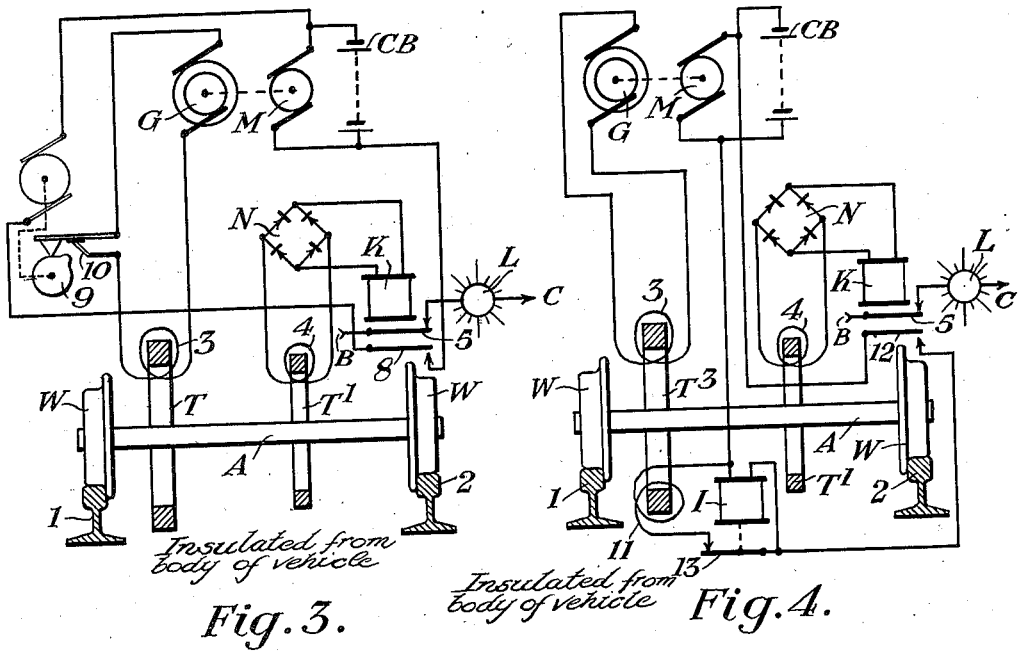

In the accompanying drawing, Fig. 1 is a diagrammatic view showing one form of apparatus embodying my invention. Figs. 2, 3, and 4 are diagrammatic views showing modified forms of the apparatus illustrated in Fig. 1, also embodying my invention.

Similar reference characters refer to similar parts in each of the several views.

Referring to Fig. 1, the reference characters 1 and 2 designate the track rails of a section of track on which light weight rail vehicles are used. It will be understood that the rails 1 and 2 form part of a track circuit, so that when the track becomes shunted by a car, protection to following traffic will be provided, in the usual manner. A rail car is represented diagrammatically by the axle A and wheels W. The axle A and wheels W form a low resistance shunting path from one to the other rail, once the film on the rail surface is broken down.

The energy for breaking down the rail film is supplied by an axle transformer T having a primary winding 3 which is energized from a generator G driven by the motor M. Motor M is supplied with current from the car battery CB. The axle A and wheels W represent a one-turn secondary for transformer T, the circuit of which secondary is completed through rails 1 and 2 and the remaining axles of the car, in parallel, as well as through the ballast resistance and any trackway apparatus connected across the two rails. Axle A is electrically insulated from the car body in order that all of the film breakdown current will be forced to flow between wheels W and rails 1 and 2 without a portion of this current being by-passed through the body of the car.

It will now be apparent that if the frequency of the current supplied from generator G is sufficiently high, transformer T may be designed to produce a voltage in its one turn secondary, of sufficient magnitude to break down the rail film and to maintain the flow of an appreciable current between wheels W and the rails, thereby establishing a low resistance path for shunting the track.

In order that the car operator may know when adequate shunting protection is being maintained, I have provided an indication relay K, energized through a rectifier N from winding 4 on the axle transformer $T^1$. Relay K is arranged to pick up when film breakdown current of a predetermined magnitude, as determined by safe shunting considerations, flows in axle A, and to release when this current decreases below a safe value. As long as shunting protection is being provided by the apparatus, lamp L which is energized over front contact 5 of relay K, will remain lighted.

Referring to Fig. 2, the apparatus shown therein is similar to the apparatus of Fig. 1, with the exception that a second generator $G^1$ is provided for energizing a second primary winding 6 on the axle transformer $T^2$. It has been found that although an appreciable voltage is needed for breaking down the rail film initially, once breakdown has occurred, much lower voltage will suffice for maintaining a satisfactory shunting path. To take advantage of this condition, a high frequency, low current generator $G^1$ is provided for energizing the winding 6 to induce the relatively higher voltage required for breakdown, the low frequency, high current generator G supplying the current required for maintaining the low resistance of the shunting path. As a result, a saving in the power consumed from the car battery is obtained, as well as a decrease in the size and capacity of transformer $T^2$.

Condenser $C^1$, in series with winding 6, is used to keep the low frequency current of generator G out of the circuit of generator $G^1$, and reactor X, in series with winding 3 has a similar effect with respect to the high frequency current of generator $G^1$. In addition, reactor X and condenser $C^1$ serve as limiting impedances to prevent an overload on either of the two generators G or $G^1$. The use of back contact 7 of relay K is optional, and when this contact is used, generator $G^1$ becomes effective for supplying the relatively higher breakdown voltage only when required by a decrease in the breakdown current below a safe value, resulting from an increase in the film resistance.

Referring to Fig. 3, the operation of the apparatus shown in this figure is, under normal conditions, the same as in Fig. 1. However, when relay K releases due to poor shunting, back contact 8 becomes closed to energize the motor device F, thereby causing cam 9 to rotate and to open and close contact 10 periodically. Each time that contact 10 is opened, a rapid decay of the flux in the core of transformer T will occur, resulting in an impulse of secondary voltage which may be above the normal value. If, at the instant when contact 10 closes, the residual flux in the core of transformer T is of a polarity opposite to that which is determined by the instantaneous polarity of the voltage applied across winding 3, a very rapid, forced change of flux will occur, resulting in an impulse of above normal secondary voltage for breaking down the film to aid the flow of the current which maintains the low resistance shunting path. As soon as the current flow is established, relay K will pick up, deenergizing the motor device F.

Referring to Fig. 4, the apparatus shown therein provides another method for at times supplying an impulse of increased secondary voltage for film breakdown. When relay K releases, the interrupter I becomes energized over back contact 12, and direct current from the car battery is supplied periodically to winding 11, over the periodically closed contact 13 of interrupter I. The flux supplied by winding 11 will at times accelerate the growth or the decay of flux supplied by winding 3, the acceleration being determined by the point of the flux cycle at which contact 12 becomes closed or opened, with the result that impulses of increased secondary voltage will occur, to aid breakdown of the film. Operation of the interrupter I will cease when the shunting path is reestablished and relay K is picked up. The device I operates as an interrupter because when its contact 13 closes a low resistance shunt is closed around the winding of device I through winding 11, whereupon contact 13 opens. This operation is repeated as long as contact 12 remains closed.

If both ends of a car are to be protected, the shunting apparatus should be duplicated at each end of the car, the forward and rear car axles being both provided with the equipment, and one generator being used to energize both sets of apparatus.

One advantage of apparatus embodying my invention is that rail brushes are eliminated and the weight of the car effective at the running wheels is made use of for aiding to break down the rail film. Another advantage is that the shunting path includes no windings or electrical connections, but extends directly through an axle and wheel pair, the resistance of which, apart from the rail film resistance, is of negligible magnitude.

It will be understood that apparatus embodying my invention may also be applied to ordinary rail cars and locomotives, other than cars of light weight, to improve shunting under conditions wherein the ordinary wheel and axle shunt is inadequate. Also, it is not necessary that the vehicle to be protected have steel wheels, as a rubber tired car, having a conducting shell or tread on the outside surface of the tire for purposes of wear, such as a steel rim member electrically connected with the axle, can be protected, as well, with the apparatus disclosed.

Although I have herein shown and described only a few forms of apparatus embodying my invention, it is understood that various changes and modifications may be made therein within the scope of the appended claims without departing from the spirit and scope of my invention.

Having thus described my invention, what I claim is:

1. In combination with a section of railway track and a rail vehicle, a track shunt for said track including an axle and a pair of running wheels of the vehicle, said axle being electrically insulated from the body of the vehicle, a transformer for said axle in which said shunt forms a secondary of the transformer, a source of varying current, and a primary on said transformer energized from said source for inducing a voltage across said shunt to break down the rail surface film thereby aiding to shunt said track.

2. In combination with a section of railway track and a rail vehicle, a track shunt on the vehicle including a wheel pair and an axle electrically insulated from the body of the vehicle, the wheels of said shunt being arranged to travel along the rails of said track, a transformer having a core which links said axle, a source of varying current, and a primary winding on the core of said transformer energized from said source for inducing a voltage across said shunt to break down the rail surface film thereby aiding to shunt said track.

3. In combination with a section of railway track and a rail vehicle, a track shunt on the vehicle including a wheel pair and an axle electrically insulated from the body of the vehicle, the wheels of said shunt being arranged to travel along the rails of said track, a transformer having a core which links said axle, a source of varying current, a primary winding on the core of said transformer energized from said source for inducing a voltage across said shunt to break down the rail surface film thereby aiding to shunt said track, and an indicator on the vehicle responsive to current from said source flowing in said track shunt.

4. In combination with a section of railway track and a rail vehicle, a track shunt on the vehicle including a wheel pair and an axle electrically insulated from the body of the vehicle, the wheels of said shunt being arranged to travel along the rails of said track, a first transformer having a core which links said axle, a source of varying current, a primary winding on the core of said first transformer energized from said source for inducing a voltage across said shunt to break down the rail surface film thereby aiding to shunt said track, a second transformer having a core which also links said axle, an indication winding on the core of said second transformer, and an indicator energized by current from said source flowing in said indication winding.

5. In combination with a section of railway track and a rail vehicle, a track shunt for said track including an axle and a pair of running wheels of the vehicle, said axle being electrically insulated from the body of the vehicle, a transformer having a core which links said axle, a first source of relatively high frequency and low current, a second source of relatively low frequency and high current, a first winding on said core energized from said first source for inducing a relatively high voltage across said shunt for breaking down the rail surface film, and a second winding on said core energized from said second source for inducing a relatively high current in said shunt for maintaining the effectiveness of said track shunt following breakdown of said rail film.

6. In combination with a section of railway track and a rail vehicle, a track shunt for said track including an axle and a pair of running wheels of the vehicle, said axle being electrically insulated from the body of the vehicle, a transformer having a core which links said axle, a first source of relatively high frequency and low current, a second source of relatively low frequency and high current, a first winding on said core, a second winding on said core energized from said second source for inducing a relatively high current in said shunt for maintaining the effectiveness of said track shunt following breakdown of said rail film, an indication relay responsive to the magnitude of the induced current from said second source flowing in said shunt, a normally open contact governed by said relay which becomes closed when said induced current decreases below a predetermined value, and a circuit including said contact for energizing said first winding from said first source to induce a relatively high voltage across said shunt for breaking down said rail film.

7. In combination with a section of railway track and a rail vehicle, a track shunt for said track including an axle and a pair of running wheels of the vehicle, said axle being electrically insulated from the body of the vehicle, a transformer for said axle in which said shunt forms a secondary of the transformer, a source of varying current, a primary on said transformer, a circuit for energizing said primary from said source to induce rail film breakdown current in said shunt, and an interrupter for periodically opening and closing said circuit for inducing an increased voltage to aid film breakdown when the residual flux in said transformer and the flux set up by said primary oppose each other at the instant when said circuit becomes closed.

8. In combination with a section of railway track and a rail vehicle, a track shunt for said track including an axle and a pair of running wheels of the vehicle, said axle being electrically insulated from the body of the vehicle, a transformer having a core which links said axle, a source of varying current, a primary winding energized from said source for inducing rail film breakdown current in said shunt, and means for periodically supplying unidirectional flux to said core to induce an increased voltage across said shunt to aid breakdown of the rail film when the flux set up by said primary winding in the transformer core and said unidirectional flux are opposing at the instant when said unidirectional flux is supplied.

9. In combination with a section of railway track and a rail vehicle, a track shunt for said track including an axle and a pair of running wheels of the vehicle, said axle being electrically insulated from the body of the vehicle, a transformer having a core which links said axle, a first source of varying current, a primary winding energized from said first source for inducing rail film breakdown current in said shunt, an auxiliary winding on said core, a second source of direct current, and means for periodically supplying direct current from said second source to said auxiliary winding for causing an increased voltage to be induced across said shunt to aid breakdown of the rail film when the flux set up by said primary winding in the transformer core and the flux set up by said auxiliary winding are opposing at the instant when said unidirectional flux is supplied.

PAUL P. SOSINSKI.